United States Patent [19]

Whitford

[11] Patent Number: 4,736,864
[45] Date of Patent: Apr. 12, 1988

[54] TANK LID

[75] Inventor: Darryl R. Whitford, Angaston, Australia

[73] Assignee: S. Smith & Son Pty. Ltd., Angaston, Australia

[21] Appl. No.: 43,150

[22] Filed: Apr. 27, 1987

[30] Foreign Application Priority Data

May 2, 1986 [AU] Australia .................. PH5718

[51] Int. Cl.⁴ ............................................. B65D 51/16
[52] U.S. Cl. ...................................................... 220/209
[58] Field of Search ............... 220/203, 207, 208, 209, 220/228, 232

[56] References Cited

U.S. PATENT DOCUMENTS 4,116,357 9/1978 Stanley, Jr. ...................... 220/208

Primary Examiner—George T. Hall
Attorney, Agent, or Firm—Rodman & Rodman

[57] ABSTRACT

A tank lid having flexible polymeric material forming an annular torus surrounding a discoid portion, pins retaining the torus seated on the upper edge of the tank. A proximity sensor which senses bulging of the discoid portion, the proximity sensor actuating a valve which will stop entry of gas such as nitrogen upon the disclosed portion bulging upwardly but allow entry of the gas when it deflects downwardly.

7 Claims, 1 Drawing Sheet

TANK LID

This invention relates to a tank lid which is useful for limiting ingress and egress of gas from the top of a tank.

In the wine industry, and also in certain instances in the chemical industry, tanks are frequently made from relatively light gauge steel, for example stainless steel, and present very large surfaces to the atmosphere and to the contents of the tank. There have been many instances of damage to the walls of the tank due to over pressure or under pressure, under pressure in particular tending to cause buckling of the walls under atmospheric pressure, and it is possible under extreme circumstances to lose some of the valuable contents of the tank, and also to cause so much buckling as to require excessive maintenance. There have been instances where the tanks became so badly damaged that they were discarded.

Because of the deleterious effect of oxygen on wine, it is usual to apply a positive pressure of nitrogen, $CO_2$ or other inactive gas to the wine contained in the tank. If this is applied to a tank which is closed with a rigid type lid, it is possible for both under pressure and over pressure to exist. If the pressure is reduced by a reducing valve, it is possible under some circumstances for air to be drawn into the tank, and damage the contents.

An object of the invention therefore is to provide improvements whereby only a very small amount of over pressure of nitrogen may be contained above wine in the tank, and the usage of nitrogen can thereby be reduced.

In an embodiment of this invention, a tank lid comprises flexible polymeric material having an annular torus surrounding a discoid portion, means to position the torus above the upper edge of a tank, sensing means which senses upward bulging of the discoid portion of the lid, and a valve actuated by the sensing means to inhibit entry of gas into the tank upon upward bulging deflection of the discoid portion but allow entry of gas upon downward deflection thereof.

An embodiment of this invention is described hereunder in some detail with reference to, and is illustrated in, the accompanying drawings, in which.

Figure 1:
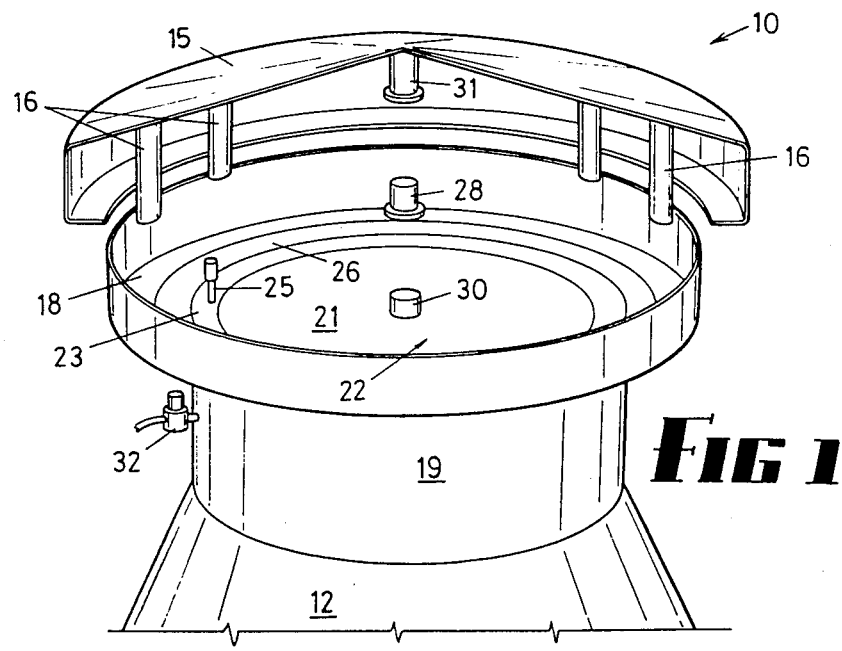
FIG. 1 is a fragmentary "exploded" view of a tank top and lid.
Figure 2:
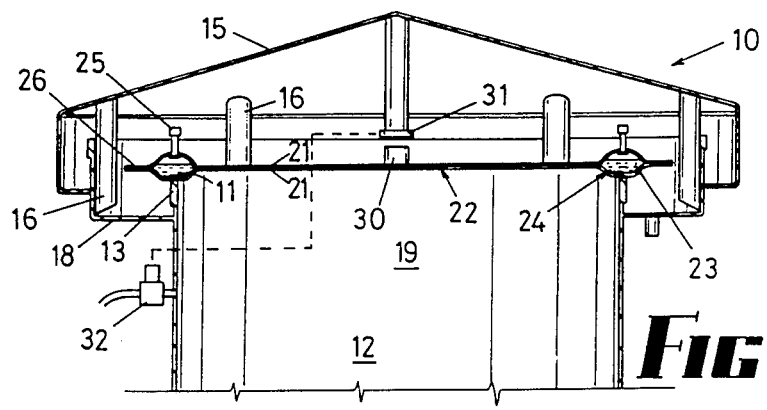
FIG. 2 is a central elevational section thereof.
Figure 3:
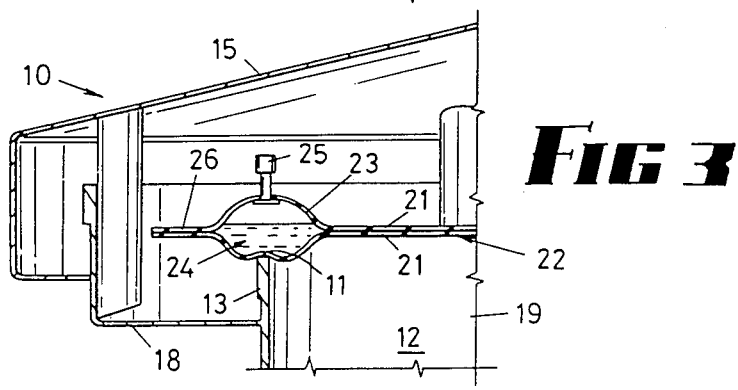
FIG. 3 is a fragmentary section but drawn to a larger scale.

In this embodiment a tank lid 10 is arranged to at least partly seal the upper edge 11 of a stainless steel tank 12 of the type commonly used in the wine industry. Such a tank usually has cylindrical side walls, a part conical upper wall, an upstanding cylindrical flange, and a stiffening bar 13 of metal at the mouth of the tank to which the cylindrical flange is welded.

In this embodiment there is provided a rigid metal cover 15 having circumferentially spaced pins 16 which depend therefrom and which terminate on an annular ring 18 which projects out radially from an upper portion 19 of the wall of the tank 12. The pins are circumferentially spaced about a central vertical axis of the rigid cover 15.

The tank lid 10 also comprises two sheets of polymeric material 21 which are joined together to have a separate discoid portion 22 surrounded by an annular torus 23 of generally circular cross-sectional shape, which overlies flange bar 13. The annular torus 23 contains liquid 24 such as water, and also contains near its upper surface an air valve 25 by which air can be delivered into the torus to apply sufficient pressure to retain a required degree of resilience. Outside the torus there is an annular flange 26, and this lies adjacent the inner surface of the pins 16, which retain the annular flange in position. As shown, there are six pins 16 which depend from the cover 15, but these are supplemented by two further pins 28 which are upstanding from the ring 18, and assist in initial placement of the flange 26, pins 28 being on the same pitch circle as pins 16.

On the upper surface of the discoid portion 22 of the lid there is provided a central stainless steel body 30 spaced a short distance away from a proximity sensor 31 which depends from rigid cover 15. The proximity sensor 31 in turn controls a gas valve (shown diagrammatically as 32) for introducing or inhibiting further flow of nitrogen at low pressure into the tank, as the discoid portion of the tank lid defects downwardly, or deflects to bulge upwardly. By this arrangement a very low over pressure of nitrogen can be maintained, and the use of nitrogen is very small.

There remains however a problem that upon lowering of the liquid level of the tank, or upon exhaustion of nitrogen, an under pressure can occur within the tank and this is very damaging to the tank walls. However the air pressure in the annular torus is so set that, upon underpressure developing, even if the valve 32 malfunctions, the discoid portion of the tank lid buckles downwardly into the space within the tank and in so doing causes a crinkling of the walls which define the annular torus, and this allows the entry of atmosphere without there being a sufficient under pressure within the tank to damage the walls.

The air pressure within the torus 23 thus sets the gas pressure at which the lid releases upon vacuum or under negative pressure, while the weight of water in the torus sets a positive pressure below which the lid will not lift due to the applied nitrogen.

A consideration of the above embodiment will indicate that the invention is capable of providing a good gas seal, even if the tank top is uneven. The nature of the lid provides a "dry" seal, compared with the more usual "waterseal", and the conditions are more aseptic.

Although the invention will be seen to be extremely simple, it embodies the features of safety and reliability, and also the feature of limiting the amount of gas which will enter the space within the tank and above liquid level, for example from a nitrogen supply.

The claims defining the invention are claimed as follows:

1. A tank lid comprising flexible polymeric material having an annular torus surrounding a discoid portion means to position the torus above the upper edge of a tank, sensing means which senses upward bulging of the discoid portion of the lid, and a valve actuated by the sensing means to inhibit entry of gas into the tank upon upward bulging deflection of the discoid portion but allow entry of gas upon downward deflection thereof.

2. A tank lid comprising flexible polymeric material according to claim 1 wherein said torus contain liquid.

3. A tank lid comprising flexible polymeric material according to claim 2 comprising an air valve outstanding from said torus whereby said torus can be inflated with air.

4. A tank lid comprising flexible polymeric material according to any one of the preceding claims comprising a flange radially outstanding from the torus.

5. A tank lid comprising flexible polymeric material according to claim 4 futher comprising a cover located above said polymeric material and locating means surrounding said flange and positioning said torus concentric with said tank upper edge.

6. A tank lid comprising flexible polymeric material according to claim 5 further comprising a ring radially outstanding from the tank same at least of, said pins depending from the cover and supporting the cover from said ring.

7. A tank lid comprising flexible polymeric material according to claim 5 or claim 6 wherein said sensing means comprises a central metal body in the discoid portion of said flexible material and a proximity sensor on the cover electrically coupled to said valve.

* * * * *

UNITED STATES PATENT AND TRADEMARK OFFICE
CERTIFICATE OF CORRECTION

PATENT NO.   : 4,736,864
DATED        : April 12, 1988
INVENTOR(S)  : Darryl R. Whitford It is certified that error appears in the above-identified patent and that said Letters Patent is hereby corrected as shown below:

In the Abstract,
    line 7, change "closed" to --coid--.

Signed and Sealed this

Twenty-third Day of August, 1988

Attest:

DONALD J. QUIGG

*Attesting Officer*       *Commissioner of Patents and Trademarks*